United States Patent
Roesch et al.

(10) Patent No.: US 9,212,060 B2
(45) Date of Patent: Dec. 15, 2015

(54) SAFETY MEANS AGAINST PRESSURE EXCEEDANCE

(71) Applicants: Alexander Roesch, Gelenau (DE); Dieter Ulber, Steinbach (DE); Ulrich Wolf, Egelsbach (DE)

(72) Inventors: Alexander Roesch, Gelenau (DE); Dieter Ulber, Steinbach (DE); Ulrich Wolf, Egelsbach (DE)

(73) Assignee: L'AIR LIQUIDE, SOCIÉTÉ ANONYME POUR L'ETUDE ET L'EXPLOITATION DES PROCÉDÉS GEORGES CLAUDE, Paris (FR)

( * ) Notice: Subject to any disclaimer, the term of this patent is extended or adjusted under 35 U.S.C. 154(b) by 4 days.

(21) Appl. No.: 14/370,983

(22) PCT Filed: Feb. 21, 2013

(86) PCT No.: PCT/EP2013/053419
§ 371 (c)(1),
(2) Date: Jul. 8, 2014

(87) PCT Pub. No.: WO2013/127683
PCT Pub. Date: Sep. 6, 2013

(65) Prior Publication Data
US 2014/0367616 A1    Dec. 18, 2014

(30) Foreign Application Priority Data
Feb. 29, 2012 (DE) .......................... 10 2012 003 834

(51) Int. Cl.
C01B 3/34 (2006.01)
B01J 19/00 (2006.01)
(Continued)

(52) U.S. Cl.
CPC ... *C01B 3/48* (2013.01); *B01J 8/06* (2013.01); *B01J 19/002* (2013.01); *C01B 3/34* (2013.01);
(Continued)

(58) Field of Classification Search
CPC ................... Y10T 137/7761; Y10T 137/7758; Y10T 137/7762; C01B 3/34; C01B 3/48; C01B 3/38; C01B 2203/1276; C01B 2203/0283; C01B 2203/1628; C01B 2203/1235; C01B 2203/0233; F16K 17/00; F16K 31/02; B01J 2219/00198; B01J 2219/00162
See application file for complete search history.

(56) References Cited

U.S. PATENT DOCUMENTS 2,483,426 A * 10/1949 Moore ........................ 261/64.3
3,585,078 A    6/1971 Sederquist et al.
(Continued)

FOREIGN PATENT DOCUMENTS

WO   WO 2009142611 A1 * 11/2009
WO   WO 2012002926 A1    1/2012

OTHER PUBLICATIONS

Hiller, et al., "Tubular Steam Reforming of Natural Gas and Other Gaseous Hydrocarbons", Ullmann's Encyclopedia of Industrial Chemistry, Sixth Edition, Dec. 1998, pp. 1-11.
(Continued)

*Primary Examiner* — Colleen Dunn
*Assistant Examiner* — Syed Iqbal
(74) *Attorney, Agent, or Firm* — Leydig, Voit & Mayer, Ltd.

(57) ABSTRACT

A safety means for protecting a plant section located on the pressure side of a jet compressor connected with a propellant system against the exceedance of an admissible pressure, comprising a controlled safety valve actuated by external energy, whose control means measures is connected with the plant section to be protected via at least one pressure tapping line, wherein the safety valve is arranged such that upon exceedance of the pressure in the protected plant section it can vent propellant from the propellant system.

18 Claims, 1 Drawing Sheet

(51) Int. Cl.
    *C01B 3/38*     (2006.01)
    *C01B 3/48*     (2006.01)
    *B01J 8/06*     (2006.01)
    *F16K 17/00*     (2006.01)
    *F16K 31/02*     (2006.01)
    *F16K 31/12*     (2006.01)

(52) U.S. Cl.
    CPC . *C01B 3/38* (2013.01); *F16K 17/00* (2013.01); *F16K 31/02* (2013.01); *F16K 31/12* (2013.01); *B01J 2219/0027* (2013.01); *B01J 2219/00065* (2013.01); *B01J 2219/00162* (2013.01); *B01J 2219/00198* (2013.01); *B01J 2219/00213* (2013.01); *B01J 2219/00231* (2013.01); *C01B 2203/0233* (2013.01); *C01B 2203/0283* (2013.01); *C01B 2203/0475* (2013.01); *C01B 2203/1235* (2013.01); *C01B 2203/1276* (2013.01); *C01B 2203/1628* (2013.01); *Y10T 137/7758* (2015.04); *Y10T 137/7761* (2015.04); *Y10T 137/7762* (2015.04)

(56) References Cited

U.S. PATENT DOCUMENTS 3,961,986 A     6/1976    Waldman
2009/0142631 A1   6/2009    Kah

OTHER PUBLICATIONS

AD 2000—Merkblatt, "Arbeitsgemeinschaft Druckbehälter", Sep. 2010, pp. 1-20, Beuth-Verlag.

* cited by examiner

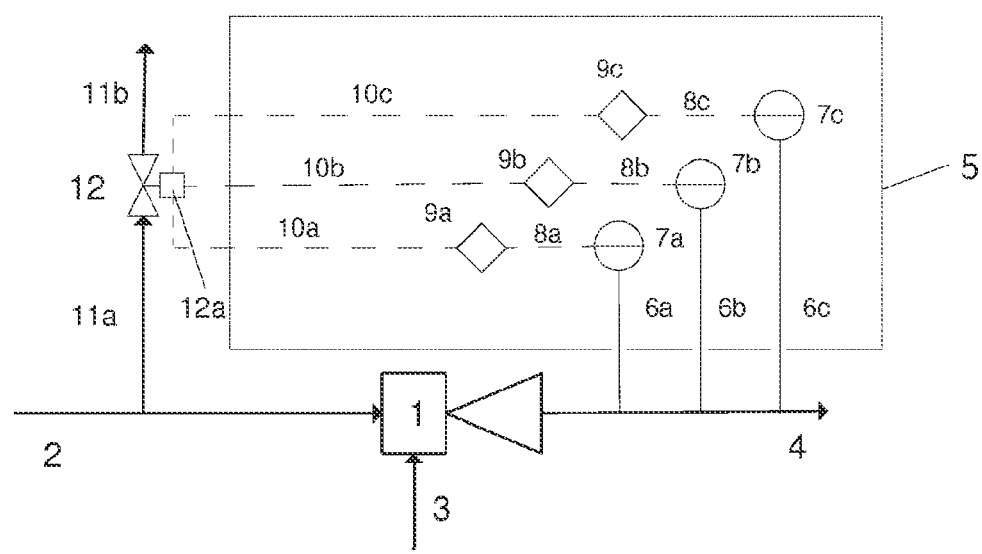

SAFETY MEANS AGAINST PRESSURE EXCEEDANCE

CROSS-REFERENCE TO RELATED APPLICATIONS

This application is a U.S. National Stage application under 35 U.S.C. §371 of International Application No. PCT/EP2013/053419, filed on Feb. 21, 2013, and claims benefit to German Patent Application No. DE 10 2012 003 834.8, filed on Feb. 29, 2012. The International Application was published in English on Sep. 6, 2013, as WO 2013/127683 A1 under PCT Article 21(2).

FIELD

This invention relates to a safety means for protecting a plant section which is located on the pressure side of a jet compressor connected with a propellant system against the exceedance of an admissible pressure.

BACKGROUND

Safety means for protecting a container or a plant section against pressure exceedance are known. General instructions in this respect can be taken from the AD 2000 leaflet of the "Arbeitsgemeinschaft Druckbehalter", issue September 2010, Beuth-Verlag. The requirements for controlled safety valves are defined in the European standard EN ISO 4126-5: 2004 (D), Beuth-Verlag.

Via a jet compressor, three plant sections located at different pressure levels are connected: The propellant system whose pressure level is the highest of these three sections as well as the parts of a process gas system located on the suction side and on the pressure side of the jet compressor. In the technical literature, the terms injector, radiator, propellant pump or jet pump can also be found as terms synonymous to jet compressor.

Because of the lack of moving parts and a drive, jet compressors are particularly simple and robust, require little maintenance and show little wear. But since on the other hand a jet compressor does not represent a mechanical barrier to the passage of gas, there is always the risk that for example in case of a blockage in the pressure-side process gas system the pressure of the propellant system is transmitted via the jet compressor to the pressure-side process gas system and the pressure admissible there is exceeded. Usually, the pressure-side process gas system is protected by a safety valve which vents process gas from this system in case of need. The vented process gas, for example when it is hazardous to the environment, must be trapped and eliminated in an innocuous way. The measures necessary for this purpose often are technically expensive and involve high costs. Furthermore, feedstocks in the process gas get lost in this way, whereby the efficiency of the material use of these feedstocks is deteriorated with regard to the generation of desired end products.

SUMMARY

An aspect of the invention provides a safety device for protecting a plant section located on the pressure side of a jet compressor connected with a propellant system against the exceedance of an admissible pressure, the safety device including: a controlled safety valve actuated by external energy. A control unit of the controlled safety valve is configured to measure a pressure in the plant section to be protected. The control unit is configured to effect opening of the safety valve upon exceedance of an admissible pressure. The safety valve is configured such that, upon exceedance of the admissible pressure in the protected plant section, the safety valve vents propellant from the propellant system.

BRIEF DESCRIPTION OF THE DRAWINGS

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 shows a controlled safety valve according to an embodiment of the invention operated with external energy, which is connected with the pipe conduit via the expansion line.

DETAILED DESCRIPTION

An aspect of the invention provides a safety means, in which the venting of process gas into the environment or a disposal of process gas fractions is avoided or minimized. The safety means preferably comprises a controlled safety valve actuated by external energy, whose control means measures the pressure in the plant section to be protected and effects opening of the safety valve upon exceedance of an admissible pressure.

According to an aspect of the invention, there is employed a commonly used type of controlled safety valve actuated by external energy. External energy can be all known forms of energy, such as, e.g., electric, hydraulic, or pneumatic energy.

The control means of the safety valve substantially consists of at least one control strand, which in turn each comprises a pressure switch and a control element which acts on the drive of the fitting. For safety reasons it is common practice and recommended by the relevant standards to install several parallel control strands. In accordance with the present invention it is preferred to provide at least three parallel control strands.

According to the invention, the pressure switch or switches of the control means each are connected with the plant section to be protected, which is located on the pressure side of the jet compressor, via a pressure tapping line, and the safety valve itself is connected with the propellant system via the expansion line.

When the exceedance of the admissible pressure in the plant section located on the pressure side of the jet compressor is registered by the control means, it effects opening of the safety valve and hence venting of propellant from the propellant system via the drive. The intended pressure decrease in the plant section to be protected, which is located on the pressure side of the jet compressor, thereby is achieved.

The advantage of the method according to the invention as compared to the prior art consists in that not the process gas potentially explosive and/or harmful to health in many cases, but merely the very much less dangerous propellant, which generally is steam or compressed air, is vented. In consideration of relevant safety aspects, the same can often directly be discharged into the atmosphere. Of course, care should be taken that the vent line of the safety valve opens out without danger. In contrast to process gas, however, it generally is not required to trap and dispose of the propellant.

Instead of a safety valve, it is also conceivable to use a simple shut-off fitting, such as, e.g., a valve, a flap, or a cock.

A further particular aspect of the invention consists in that several safety valves are installed in parallel. This measure provides for using smaller sizes. This may be advantageous when large sizes are not available. When using several safety valves, it is also possible to adjust their response pressures to each other such that they open one after the other, so that the expansion can be effected in a dosed manner.

The invention furthermore relates to a process for producing synthesis gas by reforming a hydrocarbonaceous feed gas, such as natural gas or evaporated naphtha, in which the safety means according to the invention is used advantageously. Processes for reforming such feedstocks for the purpose of obtaining synthesis gases are known to the skilled person and described in detail for example in Ullmann's Encyclopedia of Industrial Chemistry, Sixth Edition, 1998 Electronic Release, chapter "Gas Production", sub-chapter 2.2 "Tubular Steam Reforming of Natural Gas and Other Gaseous Hydrocarbons".

In the process according to the invention for producing synthesis gas by reforming a hydrocarbonaceous feed gas, such as natural gas or evaporated naphtha, the following steps are performed in detail:

a) Providing a hydrocarbonaceous feed gas. Providing comprises both supplying the feed gas, adjusting defined physical conditions, in particular pressure and temperature, and a possibly necessary pretreatment, for example the removal of sulfur-containing constituents, or the pre-reforming for pre-cracking higher hydrocarbons containing at least two carbon atoms.

b) Compressing the hydrocarbonaceous feed gas to a reactor inlet pressure and admixing steam. Suitable reactor inlet pressures and ratios of hydrocarbon to steam are known to the skilled person.

c) Supplying the mixture of hydrocarbonaceous feed gas and steam to a reforming reactor.

d) Converting the mixture of hydrocarbonaceous feed gas and steam in the reforming reactor under reforming conditions to a raw synthesis gas. Suitable reforming conditions with regard to temperature, pressure, space velocity and catalysts used are well-known to the skilled person or can easily be determined for specific applications by routine experiments.

e) Withdrawing the raw synthesis gas from the reforming reactor.

f) Optionally processing the raw synthesis gas to an end product comprising hydrogen and/or carbon oxides.

As succeeding processing step, in particular the conversion of the carbon monoxide contained in the raw synthesis gas (CO shift) may be considered, in order to increase the hydrogen content in the raw synthesis gas. Furthermore, the processing may comprise purifying stages, for example for the removal of carbon dioxide according to the known RECTISOL® process. Processing also is understood to be a succeeding reforming step, for example for realizing the so-called combined reforming process.

The process according to the invention is characterized in that in process step b) at least one jet compressor is used, which sucks in and compresses the hydrocarbonaceous feed gas, and the steam necessary for reforming is used as propellant, wherein reaching the reactor inlet pressure is measured after admixing the steam and the safety valve is arranged such that it vents steam from the propellant system upon exceedance of the reactor inlet pressure.

Surprisingly, it has been found that when using the safety means according to the invention in the production of synthesis gas by reforming a hydrocarbonaceous feed gas advantages are obtained in that here steam serves both as propellant for compression and also as reactant required for the chemical conversion. A further advantage consists in that due to the arrangement of the safety valve inside the supply for the propellant no hot, hydrocarbonaceous gas or vapor stream must be guided to the disposal, for example to the flare system. There is merely obtained a steam stream as vent stream, which in consideration of the relevant safety regulations known to the skilled person can be discharged to the atmosphere.

Further developments, advantages and possible applications of the invention can also be taken from the following description of exemplary embodiments and the drawings. All features described and/or illustrated form the invention per se or in any combination, independent of their inclusion in the claims or their back-reference.

With reference to the only FIGURE, the safety means according to the invention will be explained by way of example. FIG. 1 shows a controlled safety valve 12 operated with external energy, which is connected with the pipe conduit 2 via the expansion line 11 a, b. Via pipe conduit 2, the jet compressor 1 is connected to a propellant system. Via pipe conduit 3, the process gas is sucked in from the jet compressor 1. The control means 5 of the safety valve 12 comprises three separate, parallel control strands a, b and c. The control strand a comprises the components 6a, 7a, 8a, 9a and 10a. The control strands b and c correspondingly comprise the components designated with b or c, respectively. Via the pressure tapping lines 6 a, b, c the pressure pickups 7 a, b, c are connected with the pipe conduit 4 and hence with the part of the process gas system located on the pressure side of the jet compressor 1, which should be protected against an exceedance of the admissible pressure. Via the impulse lines 8 a, b, c the pressure pickups 7 a, b, c are connected with the control elements 9 a, b, c, which act on the drive 12a of the safety valve 12 via the control lines 10 a, b, c.

When using the safety means according to the invention in the reformation of hydrocarbons for producing synthesis gas, the feed stream containing the hydrocarbons is supplied via conduit 3 with a pressure of 31 barg. Via conduit 2, the steam used both as propellant and as reactant is guided. There can be used high-pressure steam, whose pressure usually lies in the range from about 20 to 50 barg; in the present example it amounts to 43 barg (barg corresponds to bar excess pressure). In the jet compressor 1 mixing of the feed streams 2 and 3 as well as their compression to the reactor inlet pressure of 34 barg is effected. The mixed and compressed gas stream is guided to the reforming reactor via conduit 4.

When a pressure increase beyond the desired reactor inlet pressure occurs in conduit 4, the same is registered by means of the pressure pickups 7. The control means 5 then opens the valve drive 12a of the safety valve 12, so that pure high-pressure steam is relieved from the system without any admixture of hydrocarbons, which—in consideration of corresponding safety measures—can be discharged to the atmosphere. The pressure in the conduits 2 and 4 thereby is reduced, so that the reactor inlet pressure decreases again and returns to the desired value.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS 1 jet compressor
2 conduit coming from the propellant system
3 conduit coming from the suction-side part of the process gas system
4 conduit leading to the pressure-side part of the process gas system
5 control means
6 a,b,c pressure tapping line
7 a,b,c pressure pickup
8 a,b,c impulse line
9 a,b,c control element
10 a,b,c control line
11 a,b expansion line, leading into the open via the safety fitting
12 controlled safety valve
12a valve drive

The invention claimed is:

1. A safety device for protecting a plant section located on a pressure side of a jet compressor connected with a propellant system against an exceedance of an admissible pressure, the safety device comprising:
a controlled safety valve configured to be actuated by external energy; and
a control unit associated with the controlled safety valve, the control unit being configured to measure a pressure in the plant section to be protected and to effect opening of the controlled safety valve upon the exceedance of the admissible pressure so as to vent propellant from the propellant system.

2. The safety device of claim 1, wherein the external energy is electric.

3. The safety device of claim 1, wherein the external energy is hydraulic.

4. The safety device of claim 1, wherein the external energy is pneumatic.

5. The safety device of claim 1, wherein the controlled safety valve is disposed in a propellant line upstream of the jet compressor.

6. The safety device of claim 1, wherein a plurality of the controlled safety valve are disposed in parallel to each other.

7. The safety device of claim 1, wherein the control unit includes a plurality of control strands, the control strands including pressure pickups which are connected to the pressure side of the jet compressor via pressure tapping lines, the pressure pickups being connected via impulse lines to control elements that act on a drive of the controlled safety valve via control lines.

8. A process for producing synthesis gas, the process comprising:
compressing, using at least one jet compressor, a hydrocarbonaceous feed gas to a reactor inlet pressure and admixing steam as propellant from a propellant system, the at least one jet compressor sucking in and compressing the hydrocarbonaceous feed gas to obtain a mixture of the hydrocarbonaceous feed gas and the steam;
measuring whether a target reactor inlet pressure is reached after the admixing the steam;
opening a controlled safety valve based on the target reactor inlet pressure being exceeded so as to vent the steam from the propellant system;
supplying the mixture to a reforming reactor;
converting the mixture in the reforming reactor under reforming conditions to a raw synthesis gas; and
withdrawing the raw synthesis gas from the reforming reactor.

9. The process of claim 8, further comprising:
processing the raw synthesis gas to an end product comprising hydrogen, a carbon oxide, or a mixture of two or more of these.

10. The process of claim 8, further comprising:
shifting carbon monoxide contained in the raw synthesis gas, to obtain a shifted mixture comprising increased hydrogen content relative to the raw synthesis gas.

11. The process of claim 8, further comprising:
removing carbon dioxide from the raw synthesis gas.

12. The process of claim 10, further comprising:
removing carbon dioxide from the shifted mixture.

13. The process of claim 8, wherein the hydrocarbonaceous feed gas is natural gas.

14. The process of claim 8, wherein the hydrocarbonaceous feed gas is naphtha.

15. The process of claim 8, wherein the controlled safety valve is opened using external energy.

16. The process of claim 8, wherein the controlled safety valve is disposed in a propellant line upstream of the jet compressor.

17. The safety device of claim 16, wherein the propellant line in which the controlled safety valve is disposed is an expansion line that branches off from a conduit coming from the propellant system.

18. The safety device of claim 17, wherein the controlled safety valves have different response pressures with respect to each other.

* * * * *